United States Patent
Suga et al.

(10) Patent No.: US 9,327,435 B2
(45) Date of Patent: May 3, 2016

(54) SHEET FOR DECORATION SIMULTANEOUS WITH INJECTION MOLDING AND DECORATED RESIN MOLDING

(71) Applicants: Kazuhiro Suga, Saitama (JP); Hiroyuki Atake, Tokyo (JP)

(72) Inventors: Kazuhiro Suga, Saitama (JP); Hiroyuki Atake, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 184 days.

(21) Appl. No.: 13/846,615

(22) Filed: Mar. 18, 2013

(65) Prior Publication Data
US 2013/0214449 A1    Aug. 22, 2013

Related U.S. Application Data

(62) Division of application No. 10/594,793, filed as application No. PCT/JP2005/006043 on Mar. 30, 2005, now abandoned.

(30) Foreign Application Priority Data

Mar. 30, 2004    (JP) .................................. 2004-100883

(51) Int. Cl.
*B29C 45/14* (2006.01)
*C08J 7/04* (2006.01)

(52) U.S. Cl.
CPC ..... *B29C 45/14688* (2013.01); *B29C 45/14811* (2013.01); *C08J 7/04* (2013.01); *C08J 7/042* (2013.01); *C08J 2333/00* (2013.01); *C08J 2459/00* (2013.01); *Y10T 428/31797* (2015.04)

(58) Field of Classification Search
None
See application file for complete search history.

(56) References Cited

U.S. PATENT DOCUMENTS

| | | | | |
|---|---|---|---|---|
| 4,639,341 A | * | 1/1987 | Hanamoto et al. | 264/40.1 |
| 4,902,557 A | * | 2/1990 | Rohrbacher | 428/215 |
| 5,415,536 A | * | 5/1995 | Ohno | 425/121 |
| 5,843,555 A | * | 12/1998 | Atake et al. | 428/98 |
| 5,925,302 A | * | 7/1999 | Oono et al. | 264/267 |
| 5,945,059 A | * | 8/1999 | Atake | 264/510 |

(Continued)

FOREIGN PATENT DOCUMENTS

| | | |
|---|---|---|
| EP | 1170109 | 1/2002 |
| JP | 50-19132 | 2/1975 |

(Continued)

OTHER PUBLICATIONS

Chinese Official Action dated Jun. 6, 2008, for CN Application No. 200580010732.8.
Supplementary European Search Report dated Oct. 10, 2008, for EP Application No. 05 72 7914.

*Primary Examiner* — Edmund Lee
(74) *Attorney, Agent, or Firm* — Fitch, Even, Tabin & Flannery, LLP

(57) ABSTRACT

The present invention provides a laminate-type decorative sheet for use in simultaneous decoration and injection molding, including a base film and at least a decorative layer provided on the base film, the decorative sheet having an elongation at break as measured at 25° C. of 3 to 10%, and an elongation at break as measured at 120° C. of 200% or more. The laminate-type decorative sheet exhibits good conformability to the molding surface of a mold during the course of preforming, and is less likely to produce wrinkling, blistering, breakage, etc. when laminated on and united with a resin molding through injection molding. In addition, the decorative sheet enables easy trimming.

11 Claims, 1 Drawing Sheet

(56) References Cited

U.S. PATENT DOCUMENTS

| | | | |
|---|---|---|---|
| 6,326,086 B1 * | 12/2001 | Mori et al. | 428/516 |
| 6,416,866 B1 * | 7/2002 | Atake et al. | 428/424.8 |
| 6,475,423 B1 * | 11/2002 | Masterson et al. | 264/511 |
| 6,630,246 B1 | 10/2003 | Yanagase et al. | |
| 2002/0032250 A1 * | 3/2002 | Okazaki et al. | 522/83 |
| 2003/0039839 A1 | 2/2003 | Haruta et al. | |

FOREIGN PATENT DOCUMENTS

| | | |
|---|---|---|
| JP | 61-017255 | 1/1986 |
| JP | 08-323934 | 12/1996 |
| JP | 2000-153536 | 6/2000 |

\* cited by examiner

SHEET FOR DECORATION SIMULTANEOUS WITH INJECTION MOLDING AND DECORATED RESIN MOLDING

This application is a Divisional application of application Ser. No. 10/594,793, filed Sep. 10, 2008, now abandoned the contents of which are incorporated herein by reference in their entirety. Ser. No. 11/594,793 is a National Stage application, filed under 35 USC 371, of International (PCT) Application No. PCT/JP2005/006043, filed Mar. 30, 2005.

FIELD OF THE INVENTION

The present invention relates to a sheet which is employed for simultaneous decoration of a molded article during the injection molding process (hereinafter the sheet may be referred to as a "decorative sheet for simultaneous decoration and injection molding"), and to a decorated resin molded product. More particularly, the present invention relates to a laminate-type decorative sheet suitable for forming a decorated resin molded product through simultaneous decoration and injection molding, and to a decorated resin molded product formed by use of the decorative sheet.

BACKGROUND ART

Conventionally, simultaneous decoration and injection molding has often been employed for decoration of a resin molding having a surface of complicated shape (e.g., a three-dimensional curved surface) (see, for example, Patent Documents 1 and 2). Simultaneous decoration and injection molding is a method in which, during the course of injection molding, a decorative sheet placed in a mold is united with a molten resin injected into the cavity of the mold, whereby the surface of a resin molding is decorated. In general, the simultaneous decoration and injection molding method is roughly classified into a laminate decoration method and a transfer decoration method, according to the structure of a decorative sheet to be united with a resin molding.

In the laminate decoration method, the whole decorative sheet including a base film and a decorative layer provided thereon is laminated on the surface of a resin molding so that the decorative sheet is united with the molding. The decorative sheet to be employed is a decorative laminate sheet.

An example laminate-type simultaneous decoration and injection molding method will now be described with reference to FIGS. 2 and 3. FIGS. 2 and 3 are explanatory views showing an example of the molding step of the simultaneous decoration and injection molding method. A simultaneous decoration and injection molding apparatus 60 includes a female mold 70, and a male mold 80 which is disposed laterally to the mold 70 so as to face the mold 70. The female mold 70 has a cavity 72 having a shape corresponding to the contour of a molding to be formed, and includes suction holes 74 which extend throughout the mold 70 and are open to the cavity 72. The female mold 70 is adapted to be reciprocally moved by means of a reciprocating apparatus 75 formed of, for example, a fluid-pressure cylinder in directions toward and away from the male mold 80. The male mold 80 has a core section 82 which is inserted into the cavity 72, the core section 82 including a gate 84 therein for injecting a molten resin in the cavity. If necessary, a reciprocally movable heating plate 90 is provided between the female mold 70 and the male mold 80.

In order to perform decoration simultaneously with injection molding by means of the apparatus 60, firstly, a decorative sheet 100 is provided on the female mold 70 so as to face the male mold, and, if necessary, the decorative sheet 100 is heated and softened at an appropriate temperature by means of the heating plate 90. Subsequently, the decorative sheet 100 is sandwiched by the female mold 70 and the heating plate 90, to thereby close the opening of the cavity 72. The thus-closed cavity is evacuated through the suction holes 74 provided in the female mold 70, and, if desired, pressurized air is supplied to the sheet through a vent provided in the heating plate 90. Both molds are generally heated to about 30 to about 50° C.

Through this procedure, as shown in FIG. 3, the decorative sheet 100 is stretched along the inner wall of the cavity 72 so as to come into close contact therewith. This procedure is generally called "preforming," in which a softened sheet is generally stretched up to about 200%. Subsequently, the heating plate 90 is withdrawn, and, as shown in FIG. 3, the female mold 70 is moved toward the male mold 80 so that the molds are united together, followed by mold clamping. Thereafter, a fluidized resin molding material P is injected, through the gate 84 provided in the male mold 80, into a cavity formed between the female mold 70 and the male mold 80 until the cavity is filled with the material, and thus injection molding is performed.

Through this procedure, the decorative sheet 100 placed in the female mold 70 is attached to and united with the thus-injected resin. After completion of injection molding, the molds are separated from each other, to thereby remove, from the molds, a molding whose outer surface is coated with the decorative sheet 100. Thus, laminate-type decoration is completed.

In the aforementioned simultaneous decoration and injection molding method, important requirements for formation of a good molded product are that the decorative sheet 100 can be stretched along the inner wall of the cavity 72 so as to come into close contact therewith during the course of preforming or molten resin injection (i.e., moldability of the sheet), and that the decorative sheet is not deformed through stretching to an extent exceeding that necessary for fitting the sheet to the shape of the mold, which deformation may be caused by, for example, vacuum/pressure effect, or tension due to the pressure or shear stress of the molten resin. These requirements are particularly important in the case of molding by means of a mold having a large depth, since the decorative sheet is subjected to deep drawing.

In the case of deep-draw molding (i.e., in the case where the percent stretching of a decorative sheet is high), generally, such a resin-injection-molded product is required to be decorated so as to attain a drawn shape corresponding to a percent stretching of about 200 to about 400% of the decorative sheet. In order to satisfy such a requirement, there have been proposed, for example, a decorative sheet formed of a material which has a yield point and which receives stress of a certain level or more after the yield point (see claims of Patent Document 3), and as well a decorative sheet for molding formed of two or more laminated films, the sheet exhibiting a peeling strength of a certain level or more at the interface between the sheet and a resin to be molded, wherein a transparent acrylic film is provided on the film which is bonded to the resin, and a pattern is formed between the acrylic film and the film which is bonded to the resin (see claims of Patent Document 4). In order to sufficiently conform to the irregular surface shape of the molded product, the aforementioned decorative sheet for molding exhibits an elongation at break (percent stretching) of about 150 to 200% or more, or about 400% as maximum in the temperature range of 100 to 120° C., to which the decorative sheet is heated during the preforming or injection molding.

In general, a laminate-type decorative sheet having an area exceeding the surface area of a molded product is bonded to the molded product. Therefore, the decorative sheet must be subjected to a step called "trimming" for cutting or removing an excess portion provided along the periphery of the molded product. Such trimming is performed at about 0 to about 40° C. (generally at room temperature (about 25° C.)). The aforementioned decorative sheet disclosed in Patent Document 3 or 4, which exhibits an elongation at break (percent stretching) of about 150 to about 200% or more as measured at 100 to 120° C., generally exhibits an elongation at break (percent stretching) as high as 20% or more as measured at room temperature. When such a decorative sheet exhibiting an elongation at break (percent stretching) as high as 20% or more as measured at room temperature is employed, the decorative sheet poses a problem in that an excess decorative sheet portion provided along the periphery of a molded product fails be cut successfully during the course of trimming, and thus the excess decorative sheet portion remains on the molded product, or the decorative sheet is exfoliated at an end portion of the molded product.

Meanwhile, when a decorative sheet exhibiting low elongation at break as measured at 100 to 120° C. is employed, trimming of the sheet can be readily performed, since the sheet generally exhibits low elongation at break as measured at room temperature. However, when such a decorative sheet is employed for deep-draw molding, the sheet fails to sufficiently conform to surface irregularities of a molded product, and in some cases, the sheet is broken during the course of printing.

Patent Document 1: Japanese Patent Publication (kokoku) No. S50-19132
Patent Document 2: Japanese Patent Publication (kokoku) No. S61-17255
Patent Document 3: Japanese Patent No. 2690258
Patent Document 4: Japanese Patent No. 2965973

DISCLOSURE OF THE INVENTION

In view of the foregoing, an object of the present invention is to provide a laminate-type decorative sheet which is suitable for forming a decorated resin molded product through simultaneous decoration and injection molding; i.e., a decorative sheet which exhibits good conformability to the molding surface of a mold during the course of preforming, which is less likely to produce wrinkling, blistering, breakage, etc. when laminated on and united with a resin molding through injection molding, and which enables easy trimming. Another object of the present invention is to provide a decorated resin molded product formed by use of the decorative sheet.

In order to achieve the aforementioned objects, the present inventors have conducted extensive studies, and as a result have found that the above-described problems are solved by a decorative sheet for simultaneous decoration and injection molding, the sheet having an elongation at break as measured at 25° C. falling within a certain range, and an elongation at break as measured at 120° C. of a certain level or more. The present invention has been accomplished on the basis of this finding.

Accordingly, the present invention provides:
(1) a laminate-type decorative sheet for use in simultaneous decoration and injection molding, comprising a base film and at least a decorative layer provided on the base film, the decorative sheet having an elongation at break as measured at 25° C. of 3 to 10%, and an elongation at break as measured at 120° C. of 200% or more;
(2) a decorative sheet for simultaneous decoration and injection molding as described in (1) above, which has an elongation at break as measured at 25° C. of 3 to 7%;
(3) a decorative sheet for simultaneous decoration and injection molding as described in (1) or (2) above, which has an elongation at break as measured at 120° C. of 200 to 400%;
(4) a decorative sheet for simultaneous decoration and injection molding as described in any of (1) to (3) above, wherein the base film is formed of an acrylic resin composition;
(5) a decorative sheet for simultaneous decoration and injection molding as described in (4) above, wherein the acrylic resin composition is a resin composition containing, as a primary component, a polyacrylate and/or a polymethacrylate; and
(6) a decorated resin molded product comprising a resin molding, and a decorative sheet as described in any of (1) to (5) above, the sheet being bonded onto the molding, wherein the decorative layer of the decorative sheet is bonded to the molding.

According to the present invention, there can be provided a decorative sheet for simultaneous decoration and injection molding, which is suitable for forming a decorated resin molded product through simultaneous decoration and injection molding; i.e., a decorative sheet which exhibits good conformability to the molding surface of a mold during the course of preforming, which is less likely to produce wrinkling, blistering, breakage, etc. when laminated on and united with a resin molding through injection molding, which does not break during printing, and which enables easy trimming after molding. No excess portions of the decorative sheet remain on the molded product after trimming, and no exfoliation of the decorative sheet occurs at an edge portion of the molded product.

A laminate-type decorated resin molded product of good quality can be provided through simultaneous decoration and injection molding by use of the decorative sheet.

DESCRIPTION OF REFERENCE NUMERALS

Figure 1:
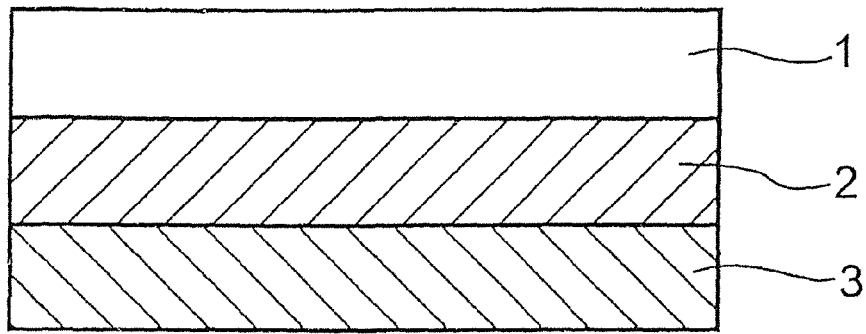
FIG. 1 is a cross-sectional view showing an example of the structure of the decorative sheet of the present invention.

1. Base film
2. Decorative layer
3. Adhesive layer
100. Decorative sheet
60. Simultaneous decoration and injection molding apparatus
70. Female mold
72. Cavity
74. Suction hole
75. Reciprocating apparatus
80. Male mold
82. Core section
84. Gate
90. Heating plate
P. Resin molding material

BEST MODE FOR CARRYING OUT THE INVENTION

The decorative sheet for simultaneous decoration and injection molding of the present invention includes a base film and at least a decorative layer provided thereon, and, if necessary, further includes an adhesive layer. The decorative sheet has, for example, a cross-sectional structure shown in FIG. 1.

A characteristic feature of the decorative sheet for simultaneous decoration and injection molding of the present invention resides in that the sheet has an elongation at break as measured at 25° C. of 3 to 10%. When the elongation at break as measured at 25° C. is less than 3%, the sheet enables easy trimming, but exhibits low strength. Therefore, in some cases, the sheet would be broken due to tensile force applied to the base film when the decorative layer is formed on the base film through printing, or the sheet would be broken when the sheet is fed to an apparatus for preforming or simultaneous decoration and injection molding. In some cases, breakage tends to occur during production of the base film, and difficulty is encountered in winding up the sheet.

Meanwhile, when the elongation at break as measured at 25° C. exceeds 10% (particularly 20% or more), trimming is difficult to perform; i.e., the sheet fails to be cut along the periphery of a molded product during the course of trimming, and thus a portion of the sheet could remain on the molded product, or the sheet could be exfoliated at an end portion of the molded product. When the elongation at break as measured at 25° C. is more than about 10% to about 20%, generally, trimming is relatively easily performed. However, depending on the shape of molded product, the stretched part of the sheet is orientated through preforming, and thus breaking strength or elongation at break would increase, resulting in difficulty in cutting the sheet during the course of trimming. From the viewpoint of easier and more reliable trimming, the elongation at break as measured at 25° C. is preferably 3 to 7%.

As used herein, the term "elongation at break" refers to the elongation at break as measured on the surface of the decorative sheet for simultaneous decoration and injection molding in all directions including MD (a flow direction during formation of the base film) and TD (a direction perpendicular to MD). The same shall apply to the case where elongation at break is measured at a temperature other than 25° C.

A characteristic feature of the decorative sheet for simultaneous decoration and injection molding of the present invention resides in that the sheet has an elongation at break as measured at 120° C. of 200% or more. The decorative sheet, which satisfies this requirement, exhibits good moldability, and good conformability to the molding surface of a mold during the course of preforming. No particular limitation is imposed on the maximum elongation at break as measured at 120° C., but an elongation at break of about 400% is sufficient for the production of a typical molded product.

In addition, since breakage or a similar problem of the base film is less likely to occur in, for example, a drying step performed when the decorative layer is printed on the base film, and the decorative sheet is expected to exhibit a certain flexibility when a resin molded product adhered by a decorative sheet is removed from a mold. Therefore, elongation at break as measured at 40° C. is preferably 10% or more. In contrast, from the viewpoint of registering for printing, preferably, elongation of the decorative sheet is small in a drying step performed when the decorative layer is printed on the base film. Therefore, elongation at break as measured at 40° C. is preferably 20% or less.

Elongation at break at each of the aforementioned temperatures is measured according to JIS K 7127. At each of the temperatures, elongation at break is calculated from the length of a non-elongated sample sheet, and the length of the sheet as measured, by means of Tensilon, at the time when the sheet is broken through elongation. More specifically, a test piece (width: 10 mm, total length: 150 mm, thickness: 0.125 mm) is provided, and two parallel gauge lines (interval: 50 mm) are formed on a center portion of the test piece. The initial distance between chucks is regulated to 100 mm, and the test speed is regulated to 100 mm/min.

A variety of resins may be employed as a base of the base film constituting the decorative sheet for simultaneous decoration and injection molding of the present invention. Examples of the resin which may employed include acrylic resin; thermoplastic polyester resin; polyolefin resins such as polyethylene, polypropylene, polybutene, and olefinic thermoplastic elastomer; styrenic resin; ABS resin; and vinyl chloride resin. Of these, acrylic resin or thermoplastic polyester resin is preferred, from the viewpoint of easy attainment of the aforementioned target elongation at break. Particularly, in consideration of various properties, including transparency, appearance (e.g., luster), weather resistance, chemical resistance, and the surface hardness of a resin molded product, acrylic resin is most preferred.

Such a resin to be employed is preferably transparent or semi-transparent so that the below-described decorative layer can be observed. Gloss of the resin can be regulated through addition of a matting agent.

Examples of the acrylic resin suitable as a base resin include poly(meth)acrylate, (meth)acrylic acid resin, polyacrylamide, and polyacrylonitrile. Of these, poly(meth)acrylate is preferred, from the viewpoints of, for example, transparency, thermal resistance, chemical resistance, and weather resistance. Specific examples of poly(meth)acrylates include polymethyl (meth)acrylate, polyethyl (meth)acrylate, polypropyl (meth)acrylate, polybutyl (meth)acrylate, polyhexyl (meth)acrylate, polyoctyl (meth)acrylate, poly(2-ethylhexyl) (meth)acrylate, methyl (meth)acrylate-butyl (meth)acrylate copolymers, methyl (meth)acrylate-styrene copolymers, and acrylic polyols obtained through copolymerization between a (meth)acrylate (e.g., methyl (meth)acrylate, ethyl (meth)acrylate, butyl (meth)acrylate, octyl (meth)acrylate, or cyclohexyl (meth)acrylate) and a (meth)acrylic acid ester having a hydroxyl group in the molecule (e.g., 2-hydroxyethyl (meth)acrylate or 2-hydroxy-3-phenoxypropyl (meth)acrylate). Of these, a methyl (meth)acrylate-butyl (meth)acrylate copolymer, which has a glass transition temperature as high as about 80 to about 105° C., is particularly preferred. The copolymerization ratio (by mass) of methyl (meth)acrylate to butyl (meth)acrylate is preferably 10/2 to 10/6, more preferably 10/2 to 10/4. The aforementioned acrylic resins may be employed singly or in combination of two or more species.

Various methods can be employed for forming, from such a base resin, the base film having the aforementioned specific elongation at break. For example, the elongation at break can be regulated by forming the base film from an acrylic resin composition or a thermoplastic resin composition prepared through addition of a filler (e.g., a rubber material such as acrylic rubber, or the aforementioned matting agent) to a base resin such as acrylic resin or thermoplastic polyester resin. Of these fillers, a rubber material is most preferred, from the viewpoint of easy control of the elongation at break. Examples of the rubber material include acrylic rubber, butadiene rubber, and silicone rubber. Of these, acrylic rubber is most preferred, in consideration of transparency of the base film.

Examples of the method for adding rubber to a base resin include a method in which the base resin is physically mixed with the rubber, and a method in which a monomer for producing the base resin is copolymerized with a monomer constituting the rubber. The amount of the rubber to be added to the base resin is about 3 to about 30 parts by mass, preferably about 10 to about 20 parts by mass, on the basis of 100 parts by mass of the base resin.

The amount of a filler (e.g., a matting agent) to be added is appropriately determined in consideration of the type of the filler to be added or the type of a base resin to be employed. The amount of the filler is generally 1 to 5 mass %, preferably 1 to 3 mass %, on the basis of the entirety of the resultant resin composition.

Elongation at break as measured at temperatures can be regulated through control of orientation of the base film. In general, in an orientation direction, the film is easily broken, and the elongation at break thereof decreases. In contrast, in a direction perpendicular to the orientation direction, the film is difficult to be broken, and the elongation at break thereof increases.

The thickness of the base film is about 50 to about 300 μm. A thickness of 50 μm or more is preferred, from the viewpoints of deep-draw moldability and surface smoothness, whereas a thickness of 300 μm or less is preferred, from the viewpoints of printability and production cost. The thickness of the base film is more preferably 50 to 200 μm, from the aforementioned viewpoints.

If necessary, the aforementioned base film may be colored with a coloring agent (e.g., a dye or a pigment). Any known coloring agent may be employed. Examples of the coloring agent which may be employed include inorganic pigments such as titanium white, carbon black, red iron oxide, cobalt blue, and chrome yellow; organic pigments such as Phthalocyanine Blue, isoindolinone, and quinacridone; metallic pigments such as aluminum powder; pearlescent pigments such as titanium-dioxide-coated mica powder; and dyes.

If necessary, the resin composition employed for forming the base film may contain a variety of additives. Examples of the additives include an antioxidant, a UV-absorbing agent, a photostabilizer, an antifriction agent, a lubricant, a plasticizer, an antistatic agent, a flame retardant, a coloring agent, an antifungal agent, and an antibacterial agent. The additive to be incorporated into the resin composition may be appropriately selected from known additives in consideration of the intended use of the decorated resin molded product of the present invention.

When, for example, the decorated resin molded product of the present invention is employed in an application requiring weather resistance, preferably, weather resistance is imparted to the base film. Therefore, in such a case, the aforementioned resin composition, which is a material for forming the base film, preferably contains, for example, an organic UV-absorbing agent such as a benzotriazole-based, benzophenone-based, or salicylic-ester-based UV-absorbing agent; an inorganic UV-absorbing agent such as zinc oxide, cerium oxide, or titanium oxide in the form of fine particles having a mean particle size of about 0.2 μm or less; or a photostabilizer such as a hindered amine photostabilizer.

The adhesive layer constituting the decorative sheet for simultaneous decoration and injection molding of the present invention may be formed of any material, which is selected in consideration of the type of the resin constituting a resin molding. When, for example, the resin molding is formed of a styrenic resin such as acrylonitrile-styrene-butadiene copolymer (ABS) resin, an acrylic resin, or polyvinyl chloride, the adhesive layer is preferably formed of an acrylic resin, a vinyl chloride-vinyl acetate copolymer, or a mixture thereof. When the resin molding is formed of a polyolefin resin, the adhesive layer is preferably formed of chlorinate polypropylene or a two-component curable urethane resin. The two-component curable urethane resin contains a polyol serving as a base material, and an isocyanate serving as a cross-linking agent (curing agent). Examples of the polyol to be employed, which has two or more hydroxyl groups in the molecule, include polyethylene glycol, polypropylene glycol, acrylic polyol, polyester polyol, polyether polyol, polycarbonate polyol, and polyurethane polyol. The isocyanate to be employed is a multi-valent isocyanate having two or more isocyanato groups in the molecule. Examples of the multi-valent isocyanate which may be employed include aromatic isocyanates such as 2,4-tolylene diisocyanate, xylene diisocyanate, and 4,4'-diphenylmethane diisocyanate; aliphatic (or alicyclic) isocyanates such as 1,6-hexamethylene diisocyanate, isophorone diisocyanate, hydrogenated tolylene diisocyanate, and hydrogenated diphenylmethane diisocyanate; and adducts and oligomers of any of the aforementioned isocyanates (e.g., a tolylene diisocyanate adduct and a tolylene diisocyanate trimer).

The decorative layer constituting the decorative sheet for simultaneous decoration and injection molding of the present invention is employed for providing characters, figures, or symbols on the surface of a resin molding, or for coloring the surface. The thickness of the decorative layer is generally 0.1 to 20 μm.

The decorative layer is generally formed by use of an ink. The ink to be employed contains, like the case of a typical ink, a vehicle formed of a binder resin or a similar material, a coloring agent (e.g., a pigment or a dye), and an additive which is appropriately added. The coloring agent may be a known coloring agent employed in the aforementioned base film. The decorative layer may be formed by use of such an ink through a known technique such as a printing technique (e.g., gravure printing, silkscreen printing, offset printing, or inkjet printing) or hand drawing. The decorative layer may have an arbitrary pattern; for example, a woodgrain pattern (e.g., a cross-grain or straight-grain pattern), a stone pattern (e.g., a marble or granite pattern), a tiled pattern, a brick pattern, a texture pattern, a character pattern, a geometric pattern, or a solid color pattern.

The binder resin to be employed in the aforementioned ink may be any resin, which is selected in consideration of the resin composition employed for forming the base film. When, for example, the base film is formed of an acrylic resin composition, the binder resin is preferably a mixture of a vinyl chloride-vinyl acetate copolymer and an acrylic resin. When the base film is formed of a thermoplastic resin composition, the binder resin is preferably a two-component curable urethane resin. The vinyl chloride-vinyl acetate copolymer to be employed generally has a vinyl acetate content of about 5 to about 20 mass % and an average polymerization degree of about 350 to about 900. If necessary, the vinyl chloride-vinyl acetate copolymer may be further copolymerized with a carboxylic acid such as maleic acid or fumaric acid.

Examples of the aforementioned acrylic resin include acrylic resins such as polymethyl (meth)acrylate, polybutyl (meth)acrylate, methyl (meth)acrylate-butyl (meth)acrylate copolymers, and methyl (meth)acrylate-styrene copolymers; and acrylic polyols obtained through copolymerization between a (meth)acrylate (e.g., methyl (meth)acrylate, ethyl (meth)acrylate, butyl (meth)acrylate, octyl (meth)acrylate, or cyclohexyl (meth)acrylate) and a (meth)acrylic acid ester having a hydroxyl group in the molecule (e.g., 2-hydroxyethyl (meth)acrylate or 2-hydroxy-3-phenoxypropyl (meth) acrylate). These acrylic resins are employed singly or in combination of two or more species. As used herein, the term "(meth)acrylate" refers to acrylate or methacrylate. The mixing ratio (by mass) of the vinyl chloride-vinyl acetate copolymer to the acrylic resin is about 1/9 to about 9/1. The two-component curable urethane resin may be, for example, any of the aforementioned ones employed as a material for forming the adhesive layer.

The decorative sheet for simultaneous decoration and injection molding includes the base film and at least the decorative layer provided thereon, and, if necessary, further includes the adhesive layer. The decorative sheet may include an additional layer; for example, a concealing layer provided on the bottom surface of the decorative layer, or a coating layer provided on the top surface of the decorative layer.

The decorated resin molded product of the present invention will next be described.

In the decorated resin molded product of the present invention, no particular limitation is imposed on the resin material constituting a resin molding (i.e., the resin material to be employed may be any resin), as long as the resin material is an injection moldable thermoplastic resin or thermosetting resin (including two-component curable resin). Examples of such a thermoplastic resin material include vinyl polymers such as polyvinyl chloride and polyvinylidene chloride; styrenic resins such as polystyrene, acrylonitrile-styrene copolymer, and acrylonitrile-butadiene-styrene copolymer resin (ABS resin); acrylic resins such as polymethyl (meth)acrylate, polyethyl (meth)acrylate, and polyacrylonitrile; polyolefin resins such as polyethylene and polyproplylene; polyester resins such as polyethylene terephthalate, ethylene glycol-terephthalic acid-isophthalic acid copolymer, and polybutylene terephthalate; and polycarbonate resin. Examples of such a thermosetting resin include two-component curable urethane resin and epoxy resin. These resins may be employed singly or in combination of two or more species. If necessary, such a resin may contain an additive; for example, an antioxidant, a heat stabilizer, a UV-absorbing agent, a photostabilizer, a flame retardant, a plasticizer, a filler (e.g., powder of an inorganic substance such as silica, alumina, calcium carbonate, or aluminum hydroxide, wood powder, or glass fiber), a lubricant, a mold release agent, an antistatic agent, or a coloring agent.

No particular limitation is imposed on the thickness of the resin molding constituting the decorated resin molded product, and the thickness is determined in consideration of the intended use of the decorated resin molded product. The thickness is generally 1 to 5 mm, preferably 2 to 3 mm.

The resin employed for injection molding may be appropriately colored with a coloring agent in consideration of the intended use of the decorated resin molded product. The coloring agent to be employed may be a known coloring agent similar to that employed in the aforementioned base film.

Next will be described the method for producing the aforementioned decorated resin molded product of the present invention.

The decorated resin molded product is produced through simultaneous decoration and injection molding by use of the aforementioned decorative sheet of the present invention. In this simultaneous decoration and injection molding, during the course of injection molding, the decorative sheet which has been placed in a mold in advance is united with a fluidized resin injected into the cavity of the mold, whereby the surface of a resin molding is decorated.

Simultaneous decoration and injection molding may be performed through a conventionally known process; for example, a process in which the decorative sheet for simultaneous decoration and injection molding is subjected to preforming, a process in which the decorative sheet is not subjected to preforming, a process in which the decorative sheet is subjected to preheating, or a process in which the decorative sheet is not subjected to preheating.

When the decorative sheet for simultaneous decoration and injection molding is subjected to deep drawing, preferably, a preforming step is carried out. In contrast, when the decorative sheet is subjected to shallow drawing, a preforming step may be omitted, and the decorative sheet may be molded by means of the pressure of a fluidized resin charged into a mold simultaneously with injection of the resin. When the decorative sheet is molded by means of the pressure of the injected resin, a step of preheating the sheet may be omitted, and the sheet may be heated by means of heat of the resin. In a step of preforming the decorative sheet, generally, an injection molding mold also serves as a vacuum forming mold. However, in the preforming step, before the decorative sheet is fed into the injection molding mold, the sheet may be subjected to vacuum forming by means of a vacuum forming mold other than the injection molding mold. In the preforming step, preferably, the injection molding mold also serves as a vacuum forming mold, from the viewpoint of efficient and precise lamination of the sheet. As used herein, the term "vacuum forming" encompasses vacuum pressure forming.

In the method for producing the decorated resin molded product of the present invention, the following steps are sequentially carried out: (A) a step of preforming the decorative sheet, (B) an injection molding step in which the decorative sheet is laminated on and united with a resin molding; and (C) a step of removing the resin molding laminated with the entirety of the decorative sheet.

In the production method, the injection molding mold to be employed may be of a male-female fitting type; i.e., a combination of a female mold (movable mold) having a molding surface of predetermined shape and a male mold (fixed mold) having a protrusion; or may be a combination of a concave mold (movable mold) having a molding surface of predetermined shape and a flat mold (fixed mold).

Next will be described a preferred mode of the method of the present invention in detail with reference to FIGS. 2 and 3, which show the aforementioned molding step in which an injection molding mold of male-female fitting type is employed.

[Step (A)]

In step (A), which is a step of preforming the decorative sheet, firstly, a decorative sheet 100 is disposed on a female mold (movable mold) 70 having a molding surface of predetermined shape so that the base film of the decorative sheet 100 faces the molding surface. Subsequently, the decorative sheet 100 is heated and softened by means of a heating plate 90. In this case, preferably, the heating temperature is equal to or higher than a temperature in the vicinity of the glass transition temperature of the sheet, and less than the melting temperature (or melting point) of the sheet. In general, heating of the sheet is more preferably performed at a temperature in the vicinity of the glass transition temperature of the sheet. The expression "a temperature in the vicinity of the glass transition temperature" refers to a temperature falling within a range of the glass transition temperature ±about 5° C. As used herein, "a temperature in the vicinity of the glass transition temperature" is generally about 70° C. to about 130° C. The heating plate 90 may be a known heating plate, and may be of, for example, a radiation heating type, a conduction heating type, or a dielectric heating type.

The decorative sheet 100 is sandwiched by the female mold 70 and the heating plate 90, and the opening of a cavity 72 is closed. The thus-closed cavity is evacuated through suction holes 74 provided in the female mold 70, and, if necessary, pressurized air is supplied to the sheet through a vent provided in the heating plate 90. The female mold 70 and a male mode are generally heated to about 30 to about 50° C.

Figure 2:
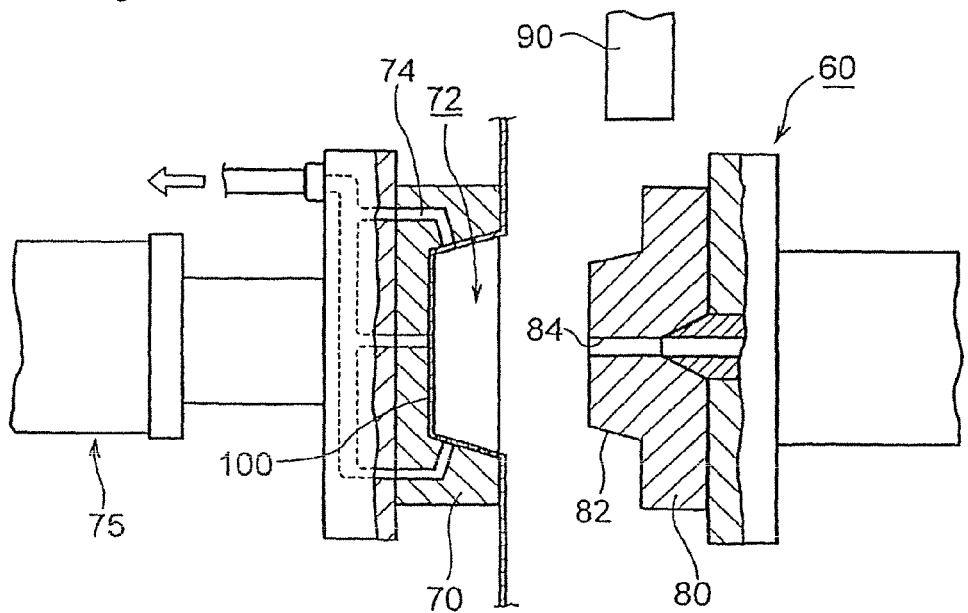
FIG. 2 is an explanatory view partially showing an example of the molding step of the simultaneous decoration and injection molding method.

Through this procedure, as shown in FIG. 2, the decorative sheet 100 is stretched along the molding surface of the female mold 70 so as to come into close contact therewith, whereby the sheet is preformed to have a predetermined shape.

[Step (B)]

In step (B) (i.e., an injection molding step), the female mold 70, in which the decorative sheet 100 is in close contact with the molding surface as described above, and a male mold (fixed mold) 80 are clamped together, and subsequently a fluidized resin molding material is injected into a cavity formed between these molds, followed by solidification of the material, whereby the decorative sheet 100 is laminated on and united with the thus-formed resin molding. Specifically, the heating plate 90 is withdrawn, and, as shown in FIG. 3, the female mold 70 is moved, by means of a reciprocating apparatus 75, toward the male mold 80 so that the molds are united together, followed by mold clamping. Thereafter, a fluidized resin molding material P is injected, through a gate 84 provided in the male mold 80, into a cavity formed between the female mold 70 and the male mold 80 until the cavity is filled with the material, followed by solidification of the material for injection molding. When the resin molding material P is formed of a thermoplastic resin, the material is fluidized through heat-melting, and solidified through cooling. When the resin molding material P is formed of a thermosetting resin, an uncured liquid resin composition is cured and solidified through chemical reaction. Through this step, the decorative sheet 100 contained in the female mold 80 is attached to and united with the thus-formed resin molding.

[Step (C)]

In step (C), the resin molding laminated and united with the decorative sheet is removed from the injection molding mold.

In step (C), the female mold 70 is separated from the male mold 80; the resin molding laminated with the entirety of the decorative sheet 100 is removed from the female mold; and an excess portion of the decorative sheet provided along the periphery of the resin molding is trimmed, to thereby yield an intended decorated resin molded product.

In the case where the injection molding mold to be employed is a combination of a concave mold (movable mold) having a molding surface of predetermined shape and a flat mold (fixed mold), a decorated resin molded product is produced through steps similar to those described above. The decorative sheet employed in the simultaneous decoration and injection molding method of the present invention may be in the form of individual sheet or continuous sheet.

EXAMPLES

The present invention will next be described in more detail by way of Examples, which should not be construed as limiting the invention thereto.

Example 1

(1) Preparation of Decorative Sheet

An acrylic film A having a thickness of 125 μm (primary component: polymethyl methacrylate, acrylic rubber content: 30 mass %, UV-absorbing agent content: 1 mass %) was melt-extruded by means of a T-die, and the film was brought into contact with a mirror roller of 100° C. at the time when the resin temperature was 150 to 200° C. for imparting printability to the film, to thereby yield a continuous-sheet-like acrylic film having a smooth printing surface. The elongation at break of the acrylic film as measured at 25° C. was found to be 5% in both MD (a flow direction during film formation) and TD (a direction perpendicular to MD). The elongation at break of the film as measured at 120° C. was found to be 240% in MD and 260% in TD.

Subsequently, a woodgrain pattern was formed on the acrylic film through rotogravure printing by use of a gravure ink, to thereby yield a patterned ink layer serving as a decorative layer. The employed ink was prepared by adding, to an acrylic resin binder, a pigment containing red iron oxide, chrome yellow, and carbon black, and a dilution solvent (1:1 (by mass) mixture of methyl ethyl ketone and ethyl acetate). Subsequently, a coating liquid containing an acrylic resin and a vinyl chloride-vinyl acetate copolymer at a ratio by mass of 1:1, and containing a dilution solvent (1:1 (by mass) mixture of methyl ethyl ketone and ethyl acetate) was applied onto the patterned ink layer, followed by drying, to thereby form an adhesive layer having a thickness of 4 μm. Thus, a decorative sheet was prepared.

Rotogravure printing was performed by means of a three-color rotogravure printing machine (including three printing units) under the following conditions: printing speed: 40 m/minute, acrylic film tension: 20 kg/m width. Continuous printing was able to be performed without causing breakage of the film.

(2) Production of Decorated Resin Molded Product

Figure 3:
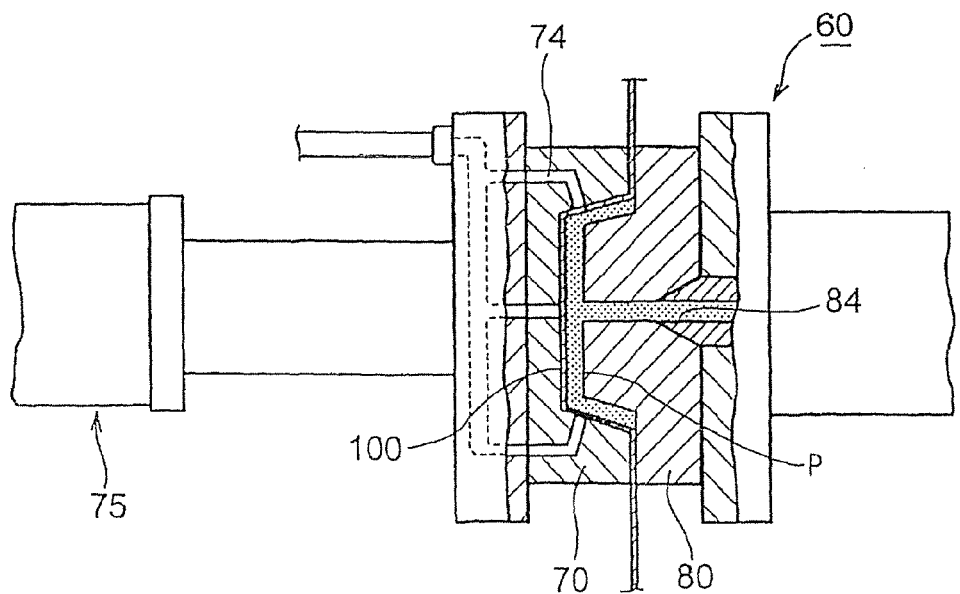
FIG. 3 is an explanatory view partially showing an example of the molding step of the simultaneous decoration and injection molding method.

A laminate-type decorated resin molded product was produced through simultaneous decoration and injection molding according to the steps shown in FIGS. 2 and 3 by use of the decorative sheet prepared in (1) above, and a resin molding material; i.e., ABS resin ["Kralastic MTH-2" (tradename), product of Nippon A & L Inc.]. Preforming and injection molding conditions are as follows.

<Preforming Conditions>
  Heating plate temperature: 300° C.
  Distance between heating plate and film: 15 mm (non-contact radiation heating)
  Heating time: 5 seconds
  Decorative sheet surface temperature: 120° C.
  Forming method: vacuum pressure forming <Injection Molding Conditions>
  Injected resin: ABS resin (described above)
  Resin temperature: 230° C.
  Mold temperature: 50° C.
  Injection pressure: 140 MPa
  Injection time: 3 seconds
  Cooling time: 20 seconds
  Number of gates: 6

The state of lamination of the decorative sheet in the thus-produced decorated resin molded product was visually observed, and moldability of the decorative sheet was evaluated on the basis of the below-described criteria. Also, trimming performance of the decorative sheet was evaluated on the basis of the below-described criteria. The results are shown in Table 1.

Evaluation Criteria (Moldability of the Decorative Sheet)

O: No wrinkling, blistering, exfoliation, nor breakage is observed in the decorative sheet.

Δ: Slight wrinkling or blistering is observed in the decorative sheet.

x: Any of wrinkling, blistering, exfoliation, and breakage is observed in the decorative sheet, causing problems in practical use.

Evaluation Criteria (Trimming Performance)

○: Trimming is easily performed, and no flash nor exfoliation of the decorative sheet is observed at an end portion of the molded product.

Δ: Flash remains on an edge portion of the molded product, due to incomplete trimming of the decorative sheet.

X: Exfoliation of the decorative sheet is observed at an edge portion of the molded product.

Example 2

An acrylic film B, which has the same composition as the acrylic film A except that the primary component is polymethyl acrylate, was employed instead of the acrylic film A, and a continuous-sheet-like acrylic film having a smooth printing surface was formed in a manner similar to that of Example 1. The elongation at break of the acrylic film as measured at 25° C. was found to be 8% in MD and 7% in TD. The elongation at break of the film as measured at 120° C. was found to be 210% in MD and 200% in TD.

Subsequently, in a manner similar to that of Example 1, a patterned ink layer and an adhesive layer were provided on the acrylic film, to thereby prepare a decorative sheet. In a manner similar to that of Example 1, a laminate-type decorated resin molded product was produced through simultaneous decoration and injection molding by use of the decorative sheet.

Table 1 shows the results of evaluation of moldability, trimming performance, and continuous printability of the decorative sheet of the thus-produced decorated resin molded product.

Comparative Example 1

An acrylic film similar to that employed in Example 1 was melt-extruded by means of a T-die, followed by stretching. The acrylic film was oriented in MD through regulation of drawing speed or regulation of contact pressure against a mirror roller, to thereby yield a base film having an elongation at break as measured at 25° C. of 20% in MD and 7% in TD. The elongation at break of the base film as measured at 120° C. was found to be 120% in MD and 200% in TD.

By use of the base film, a decorative sheet and a decorated resin molded product were produced in a manner similar to that of Example 1, followed by evaluation of the decorative sheet in a manner similar to that of Example 1. The results are shown in Table 1.

Comparative Example 2

The procedure of Example 1 was repeated, except that the acrylic film A was replaced by an acrylic film C (thickness: 125 μm) formed solely of polymethyl (meth)acrylate resin, and that a base film was prepared through casting of an acrylic resin solution onto a metallic mirror belt, to thereby yield a decorative sheet and a decorated resin molded product. The decorative sheet was evaluated in a manner similar to that of Example 1. The results are shown in Table 1.

When the base film was subjected to continuous gravure printing in a manner similar to that of Example 1, the film was broken due to solvent attack or tensile force during the course of printing, resulting in failure of printing on the base film. Therefore, the base film was subjected to sheet-fed screen printing.

The elongation at break of the acrylic film as measured at 25° C. was found to be 2% in MD and 2% in TD. The elongation at break of the acrylic film as measured at 120° C. was found to be 320% in MD and 350% in TD.

Comparative Example 3

The procedure of Example 1 was repeated, except that a commercially available polycarbonate film ("Iupilon" (tradename), product of Mitsubishi Engineering-Plastics Corporation) was employed, to thereby yield a decorative sheet and a decorated resin molded product. The decorative sheet was evaluated in a manner similar to that of Example 1. The results are shown in Table 1.

The elongation at break of the polycarbonate film as measured at 25° C. was found to be 120% in MD and 130% in TD. The elongation at break of the polycarbonate film as measured at 120° C. was found to be 200% in MD and 240% in TD.

TABLE 1

|  |  |  | Ex. 1 | Ex. 2 | Comp. Ex. 1 | Comp. Ex. 2 | Comp. Ex. 3 |
|---|---|---|---|---|---|---|---|
| Elongation at break (%) | 25° C. | MD | 5 | 8 | 20 | 2 | 120 |
|  |  | TD | 5 | 7 | 7 | 2 | 130 |
|  | 120° C. | MD | 240 | 210 | 120 | 320 | 200 |
|  |  | TD | 260 | 200 | 200 | 350 | 240 |
| Moldability of decorative sheet |  |  | ○ | ○ | Δ | ○ | ○ |
| Trimming performance |  |  | ○ | ○ | X | ○ | X |
| Continuous printability |  |  | ○*1 | ○*1 | ○*1 | X*2 | ○*1 |

○*1: The film was not broken under the printing conditions described in Example 1, and continuous printing was able to be performed.
X*2: The base film was broken under the printing conditions described in Example 1, and printing failed to be performed.

INDUSTRIAL APPLICABILITY

The decorative sheet of the present invention exhibits good moldability, and thus is suitable for forming a decorated resin molded product through simultaneous decoration and injection molding. In addition, the decorative sheet enables easy trimming. Employment of the decorative sheet of the present invention enables production of a decorated resin molded product of good quality which is used in a variety of applications, including an interior material for vehicles, a surface member for home electric appliances, and miscellaneous goods.

The invention claimed is:

1. A method for producing a decorated resin molded product, comprising:
    (a) injection molding a resin into a mold having a decorative sheet in the mold, to form a resin molding, such that the decorative sheet is laminated on and united with the resin molding; and
    (b) removing from the mold the resin molding laminated with an entirety of the decorative sheet, wherein the removing of the resin molding includes trimming of an excess portion of the decorative sheet provided along a periphery of the resin molding,
    wherein the decorative sheet is a laminate, and comprises a base film and at least a decorative layer provided on the base film, the decorative sheet having an elongation at break as measured at 25° C. of 3 to 10%, and an elongation at break as measured at 120° C. of 200% or more, and both the elongation at break as measured at 25° C. and 120° C. are measured in all directions including MD, being a flow direction during formation of the base film, and TD, being a direction perpendicular to MD, wherein the base film includes at least one rubber material selected from the group consisting of acrylic rubber, butadiene rubber and silicone rubber, and wherein the decorative sheet is simultaneously subjected to decoration and injection molding.

2. The method according to claim 1, further comprising, prior to the injection molding, preforming the decorative sheet.

3. The method according to claim 2, wherein the preforming the decorative sheet includes heating the decorative sheet so as to soften the decorative sheet, wherein the mold includes a female part, and wherein the preforming brings the decorative sheet into contact with the surface of the female part of the mold.

4. The method according to claim 1, wherein the decorative sheet has an elongation at break as measured at 40° C. of 20% or less, and 10% or more, the elongation at break as measured at 40° C. is measured in all directions including MD, being a flow direction during formation of the base film, and TD, being a direction perpendicular to MD.

5. The method according to claim 1, wherein the decorative layer is an ink layer printed on the base film.

6. The method according to claim 1, wherein the decorative sheet has an elongation at break as measured at 25° C. of 3 to 7%, the elongation at break as measured at 25° C. being measured in all directions including MD, being a flow direction during formation of the base film, and TD, being a direction perpendicular to MD.

7. The method according to claim 1, wherein the decorative sheet has an elongation at break as measured at 120° C. of 200 to 400%, the elongation at break as measured at 120° C. being measured in all directions including MD, being a flow direction during formation of the base film, and TD, being a direction perpendicular to MD.

8. The method according to claim 1, wherein the base film is formed of an acrylic resin composition.

9. The method according to claim 8, wherein the acrylic resin composition is a resin composition containing, as a primary component, a polyacrylate and/or a polymethacrylate.

10. The method according to claim 1, wherein the base film is formed of an acrylic resin composition comprising polymethyl (meth)acrylate as a primary component, and an acrylic rubber.

11. The method according to claim 10, wherein the resin is an acrylonitrile-butadiene-styrene copolymer resin.

* * * * *